(12) United States Patent
Webb et al.

(10) Patent No.: US 9,912,819 B2
(45) Date of Patent: Mar. 6, 2018

(54) AUDIO CAPTURE AND TRANSMISSION DEVICE HAVING SOUND ATTENUATION

(71) Applicant: Talk Technologies Inc., Victoria (CA)

(72) Inventors: Stephen D. Webb, Victoria (CA); Nigel Kostiuck, Victoria (CA); Damon Langlois, Victoria (CA)

(*) Notice: Subject to any disclaimer, the term of this patent is extended or adjusted under 35 U.S.C. 154(b) by 87 days.

(21) Appl. No.: 15/098,193

(22) Filed: Apr. 13, 2016

(65) Prior Publication Data

US 2016/0301807 A1    Oct. 13, 2016

Related U.S. Application Data

(60) Provisional application No. 62/146,647, filed on Apr. 13, 2015.

(51) Int. Cl.

| | |
|---|---|
| H04R 9/08 | (2006.01) |
| H04R 11/04 | (2006.01) |
| H04R 17/02 | (2006.01) |
| H04R 21/02 | (2006.01) |
| H04M 9/08 | (2006.01) |
| H04W 4/00 | (2018.01) |
| H04R 1/08 | (2006.01) |

(Continued)

(52) U.S. Cl.
CPC ........... *H04M 9/085* (2013.01); *G10L 21/007* (2013.01); *H04M 1/7255* (2013.01); *H04R 1/083* (2013.01); *H04W 4/008* (2013.01); *H04R 2420/07* (2013.01)

(58) Field of Classification Search
CPC ... H04M 9/085; H04M 1/7255; G10L 21/007; H04R 1/083; H04R 2420/07; H04W 4/008

USPC .......................................................... 381/360
See application file for complete search history.

(56) References Cited

U.S. PATENT DOCUMENTS

| 1,776,584 A | 9/1930 | Gerlach |
|---|---|---|
| 2,117,236 A | 5/1938 | Beard |

(Continued)

FOREIGN PATENT DOCUMENTS

| WO | 2009/0029667 | 3/2009 |
|---|---|---|
| WO | WO2009029667 | 3/2009 |

OTHER PUBLICATIONS

Extended European Search Report dated Oct. 16, 2014 in EP16164952.0 (5 pages).

(Continued)

*Primary Examiner* — Sean H Nguyen
(74) *Attorney, Agent, or Firm* — Baumgartner Patent Law

(57) ABSTRACT

Provided is a device for simultaneously communicating with a first wireless communication device and a second wireless communication device. A microphone is housed within the device and circuitry therefor is included in the device, and preferably housed within the device. The device form-fits generally over a user's mouth and nose and has an air tube extending substantially the length of the device, within the interior of the device, to relieve back-pressure. The device is shaped to promote attenuation of sound within the device, and is constructed to reduce uptake of outside, extraneous sound by the microphone. The circuitry comprises one or more processors, an audio capture module, power management module, listening output module, and data storage module. The device also has a touch screen interface.

8 Claims, 9 Drawing Sheets

(51) Int. Cl.
 *G10L 21/007* (2013.01)
 *H04M 1/725* (2006.01)

(56) References Cited

U.S. PATENT DOCUMENTS

| | | | |
|---|---|---|---|
| 2,408,474 A | 12/1944 | Newman |
| 2,508,581 A | 5/1950 | Morrow |
| 2,526,177 A | 10/1950 | Webb |
| 2,572,547 A | 10/1951 | Webb |
| 2,625,615 A | 1/1953 | Webb |
| 2,745,911 A | 5/1956 | Webb |
| D177,947 S | 6/1956 | Sherwood |
| 2,769,039 A | 10/1956 | Webb |
| 2,848,565 A | 8/1958 | Webb |
| 2,855,067 A | 10/1958 | Di Mattia |
| 2,857,013 A | 10/1958 | Orso |
| 2,830,135 A | 12/1958 | Webb |
| 2,882,355 A | 4/1959 | Webb |
| D193,187 S | 7/1962 | Webb |
| 3,114,802 A | 12/1963 | Beguin |
| 3,193,624 A | 5/1965 | Webb et al. |
| 3,796,842 A | 3/1974 | Guille |
| D236,033 S | 7/1975 | Dryden |
| 4,129,754 A | 12/1978 | Gore |
| 4,396,089 A | 8/1983 | Scully |
| 4,834,212 A | 5/1989 | Figone |
| D303,440 S | 9/1989 | Campbell |
| D355,484 S | 2/1995 | Rinehart |
| D427,986 S | 7/2000 | Webb |
| 6,121,881 A | 9/2000 | Bieback |
| 7,761,106 B2 | 7/2010 | Konchitsky |
| 7,783,034 B2 | 8/2010 | Manne |
| 8,243,944 B2 | 8/2012 | Amalgro |
| D673,134 S | 12/2012 | Webb |
| D738,345 S | 9/2015 | Webb |
| D738,346 S | 9/2015 | Webb |
| 2002/0077838 A1 | 6/2002 | Dutta |
| 2005/0096096 A1 | 5/2005 | Birli et al. |
| 2012/0029912 A1 | 2/2012 | Amalgro |
| 2014/0081631 A1 | 3/2014 | Manli et al. |
| 2015/0111610 A1* | 4/2015 | Hwang ............ H04W 72/1215 455/553.1 |
| 2015/0235652 A1* | 8/2015 | Moser ................ H04R 1/225 379/392.01 |

OTHER PUBLICATIONS

Extended European Search Report Issued in European Patent Application No. 16164952.0 dated Oct. 14, 2016 (5 Pages).

\* cited by examiner

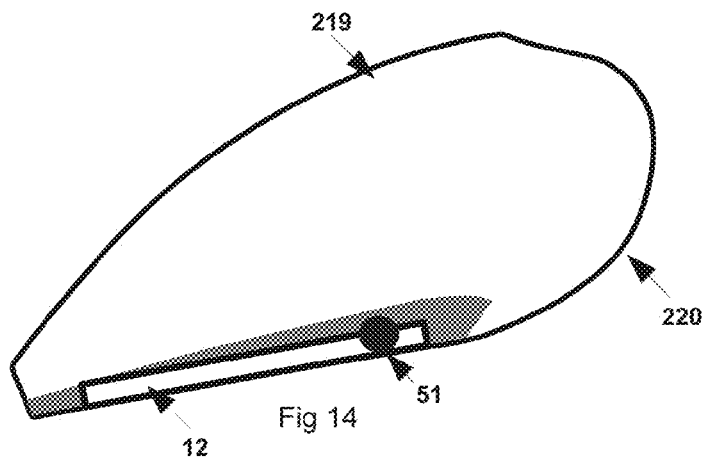
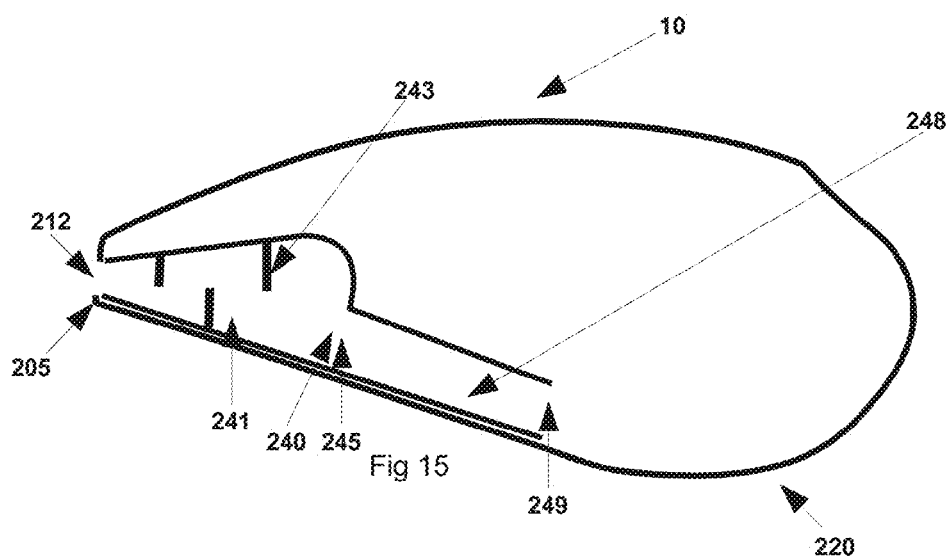
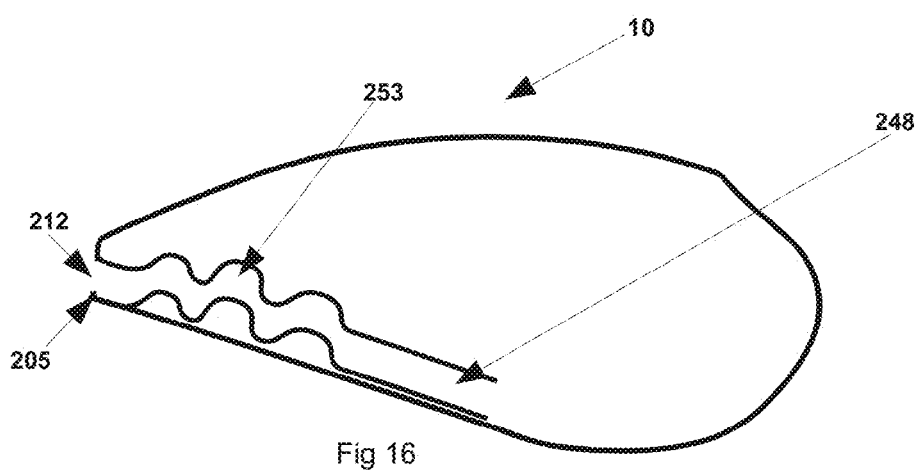

Fig 20A
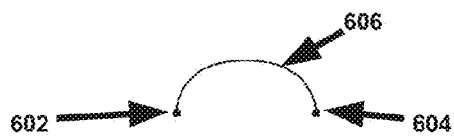
Fig 20B
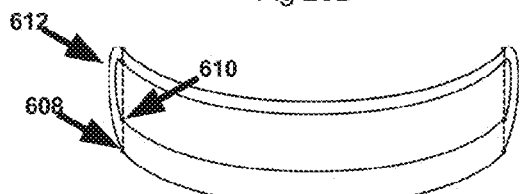
Fig 20C
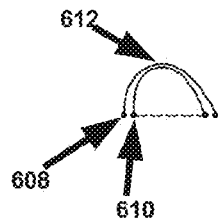
Fig 20D
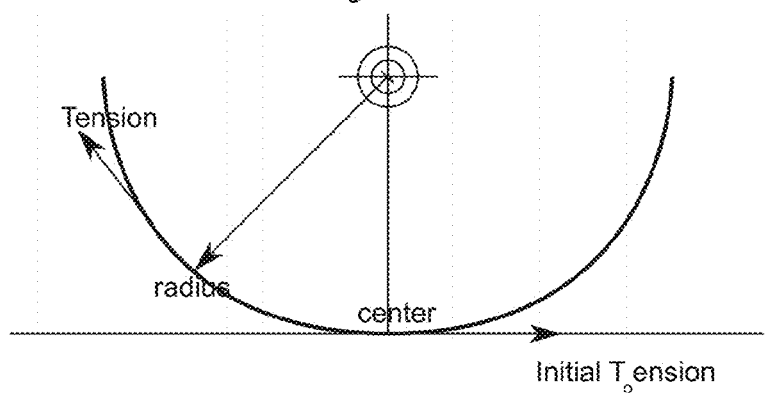
Fig 20E
$$x = a\, arcsinh\left(\frac{p}{a}\right) + \frac{T_0}{E} p$$
$$y = \sqrt{a^2 + p^2} + \frac{T_0}{2 E_a} p^2$$
Fig 20F

AUDIO CAPTURE AND TRANSMISSION DEVICE HAVING SOUND ATTENUATION

CROSS REFERENCE TO RELATED APPLICATIONS

This application is related to, and claims the benefit of, U.S. Provisional Application No. 62/146,647, filed Apr. 13, 2015. The above-identified priority patent application is incorporated herein by reference in its entirety.

FIELD

The present technology relates to a wireless, small, ergonomically designed, voice transmitting and attenuating device for fitting over a user's mouth. The device contains a microphone, two radios for simultaneously transmitting a user's voice to an earphone and to a communication device and a voice signal enhancement circuit for improving the communication signal. The structural design minimizes the escape of any sound from the device to the outside environment and reduces or minimizes the amount of ambient sound that reaches the microphones, thereby providing very clear, high fidelity voice transmission which can then be recorded.

BACKGROUND

Various devices have been developed for damping and recording voice sound waves. For example, U.S. Pat. No. 3,114,802 discloses an early design that essentially provides a cup-like structure for fitting over the user's mouth, with a microphone housed therein.

Similar devices have been used by court reporters. One such acoustic mask is disclosed in U.S. Pat. No. 3,193,624. This device has a cylindrical outer casing and a separate wall structure housed within the casing with a microphone mounted on this structure. The device includes a cylindrical air inhalation passageway extending outward from the face-masking structure for inhalation, with a diaphragm to restrict expulsion of air. One or more openings in the face-masking structure allow for exhaled air and sound to escape. The face-fitting part of the device is rubber and must be pressed to the user's face in order to reduce the amount of sound escaping to the ambient. The device is not designed to reduce leakage of ambient sound into the device, nor is it ergonomically designed. Further, there is no means for the user to hear the sound that they are producing in the device.

Another acoustic mask is disclosed in U.S. Pat. No. 4,129,754. The device includes a barrel with a bell-shaped back, the latter preferably being set at an angle with respect to the barrel. A microphone is positioned at the end of the barrel remote from the bell-shaped back. The barrel portion and a portion of the bell-shaped back are lined with foam urethane to muffle noise and absorb moisture. The reporting device includes orifices located at the junction between the bell-shaped back (face piece) and the barrel for permitting pressurized air within the device to escape to the outside via an air communication channel from inside the device to the outside. Again, the face piece is a soft pliable material that requires it be pressed against the user's face in order to reduce escape of the user's voice from within the device. Further, there is no means for the user to hear the sound that they are producing in the device.

In a related technology, U.S. Pat. No. 6,121,881 discloses a protective mask communication device including a housing constructed to be mounted on a protective mask. A microphone is located within the housing. The mask is contemplated to be a safety mask, such as that worn by firefighters. No attempts are made to restrict escape of sound into the ambient atmosphere or reduce ambient sound.

U.S. Pat. No. 8,243,944 discloses a handheld foldable voice-muffling device using passive noise damping materials to decrease noise and a single microphonic transceiver to transmit a user's speech and receive incoming signals allowing him to wirelessly communicate with another person or other communication devices. The deformable materials used in the device do not adequately muffle the sound of the user nor ambient sound. Further, the device must be pressed to the user's face in order for the deformable material to form to the user's face. This is uncomfortable for the user, but is necessary to reduce the escape of sound between the face piece and the user's face. The device is not designed to record sound with the microphone and transmit the sound simultaneously to each of an ear piece and a phone. This makes communication difficult as the user is not experiencing the normal sounds that one experiences during a conversation.

There is a need for a small voice attenuating device that provides very clear, high fidelity voice transmission simultaneously to both the user, by means of an ear piece, and to a wireless communication device such as a cell phone. Such a device would preferably overcome the challenges of recording or transmitting a user's voice while attenuating the sound of the user's voice. It would also preferably cancel or reduce ambient noise without the need for noise canceling microphones.

SUMMARY

The present technology provides a small device for fitting generally over a user's mouth to provide very clear, high fidelity voice transmission. It functions as an intermediary between an ear piece and a cellular phone, computer or transmitter, by recording sound with the microphone and simultaneously transmitting the sound to each of the ear piece and the phone. This functional feature is achieved with a single microphone in communication with two radios positioned in specific orientations within the device. It overcomes the challenges of recording or transmitting a user's voice while attenuating the sound of the user's voice. It also cancels, minimizes or reduces any ambient noise without the need for noise canceling microphones. It provides the means to dictate without being overheard or to have confidential phone conversations in crowded environments such as restaurants. Both structural features and a voice signal enhancement circuit provide these advantages.

In one embodiment, an audio capture and transmission device for simultaneously communicating with a first wireless communication device and a second wireless communication device is provided, the audio capture and transmission device for fitting generally over a user's mouth, the audio capture and transmission device comprising: a single microphone; two wireless radios; circuitry, including a processor and a memory; a housing, the housing including a first side and a second side each attached to a base and a back and extending therebetween, a proximal end, and a distal end, the back, the first side, the second side and the base extending from the proximal end to the distal end, to define an interior cavity, the interior cavity housing the microphone and the wireless radios, the microphone in electronic communication with the circuitry and the wireless radios; a face piece located at the proximal end of the housing, the face piece defining a proximal opening continuous with the interior cavity and having a face-fitting rim; and an exhaust system, the exhaust system in gaseous communication with the interior cavity and an ambient environment, and including an at least one air tube, and an exhaust port, the at least one air tube extending from the interior cavity to the distal end, where it terminates in the exhaust port.

In the device, the two wireless radios may be Bluetooth radios.

In the device, each Bluetooth radio may include an antenna to provide two antennae, the two antennae positioned to have a linear horizontal center-to-center distance of not less than about 25 mm and not more than about 27.5 mm between the antennae.

In the device, the antennae may be positioned to have a vertical offset of not less than about 3 mm and not more than about 4 mm between the antennae.

The device may further comprise a touch screen interface controlled by the processor, wherein the touch screen includes at least one screen control for at least one of placing a call, answering a call and ending a call on a communication device associated with the device.

In the device, the antennae may be mirrored on a fiberglass-resin stack-up.

In the device, the circuitry may include a voice signal enhancement (VSE) circuit, the VSE circuitry configured to create a phase shift on an original signal to produce a phase shifted signal and to add the phase shifted signal to the original signal.

In the device, the microphone may be located about 15 to about 35 mm from the proximal end.

In the device, the face-fitting rim may have a dual double catenary shape.

In the device, the exhaust system may include at least one pressure buffer, the at least one air tube extending from a vicinity of the proximal end to the at least one pressure buffer and the at least one pressure buffer extending to the exhaust port at the distal end.

In the device, the housing may be tapered from the proximal end to the distal end and the proximal end of the housing defines an angle with the base of about 40 to about 70 degrees.

In another embodiment, a method of simultaneously communicating to a first communication device and a second communication device is provided, the method comprising placing the device described above generally over the user's mouth and the user speaking into the device.

In the method, the first communication device may be a cellular phone and the second communication device may be a wireless earpiece or ear phone.

In another embodiment, a device for capturing and attenuating a voice from a user's mouth is provided, the device comprising: a housing, the housing defining an interior cavity and having a Shore D durometer rating of about 70 to about 85; a face piece attached to a proximal end of the housing or continuous with the housing and comprising a face-fitting rim to define an opening, the opening continuous with the interior cavity, wherein the face-fitting rim of the face piece has a dual double catenary shape and has a Shore D durometer rating of about 70 to about 85; a single microphone housed within the interior cavity; circuitry in electronic communication with the microphone; and an exhaust system, the exhaust system in gaseous communication with the interior cavity and an ambient environment and configured to provide controlled relief of exhaust from the interior cavity to the ambient environment.

In the device, the exhaust system may be housed in the interior cavity and include: an at least one air tube; an at least one pressure buffer; and an exhaust port, the at least one air tube extending from a vicinity of the proximal end to the at least one pressure buffer and the at least one pressure buffer extending to an exhaust port at the distal end.

In the device, the at least one air tube may be tapered or funnel-shaped.

The device may further comprise two wireless radios housed within the interior cavity and in electronic communication with the microphone.

In the device, the wireless radios may be Bluetooth radios.

In the device, the Bluetooth radios may include an antenna to provide two antennae, the two antennae positioned in the device to have a linear horizontal center-to-center distance of not less than about 25 mm and not more than about 27.5 mm between the antennae.

In yet another embodiment, a face piece for use with a voice attenuating device is provided, the face piece comprising a body, a bore therethrough and a dual double catenary rim to define an opening of the bore The face piece may have a Shore D durometer rating of at least about 70 to at least about 85.

The device may further comprise a touch screen interface controlled by the processor.

In the device, the touch screen may include at least one screen control for at least one of placing a call, answering a call and ending a call on a communication device associated with the device.

In the device, the touch screen may include an incoming call display.

In the device, the touch screen may include a mute button for the microphone.

In another embodiment, a method of simultaneously communicating to a first a communication device and a second communication device is provided, the method comprising placing the audio capture and transmission device generally over the user's mouth and the user speaking into the audio capture and transmission device.

The method may further comprise placing a call on the first communication device with the audio capture and transmission device.

The method may further comprise answering a call on the first communication device with the audio capture and transmission device.

The method may further comprise ending a call on the first communication device with the audio capture and transmission device.

In the method, the first communication device may be a cellular phone and the second communication device may be a wireless earpiece or ear phone.

FIGURES

FIG. 14 is an interior sectional view of the device of FIG. 9 showing placement of the microphone and tubes.

FIG. 15 is an interior sectional view of the device of FIG. 9.

FIG. 16 is an interior sectional view of an alternative embodiment of the device of FIG. 9.

FIG. 20A is a schematic showing the top and bottom curvature of the double catenaries of the dual double catenaries that form the face piece of the device of the present technology;

FIG. 20B is a schematic showing the tensioned area between the first and second curves of the double catenaries of the dual double catenaries that form the face piece of the device of the present technology;

FIG. 20C is a schematic showing the third and fourth curves of the double catenaries of the dual double catenaries that form the face piece of the device of the present technology;

FIG. 20D is a schematic showing the tensioned flap curve between the third and fourth curves of the double catenaries of the dual double catenaries that form the face piece of the device of the present technology;

FIG. 20E is a schematic showing how the tension is created; and

FIG. 20F is the equation for the catenary.

DESCRIPTION

Figure 1:
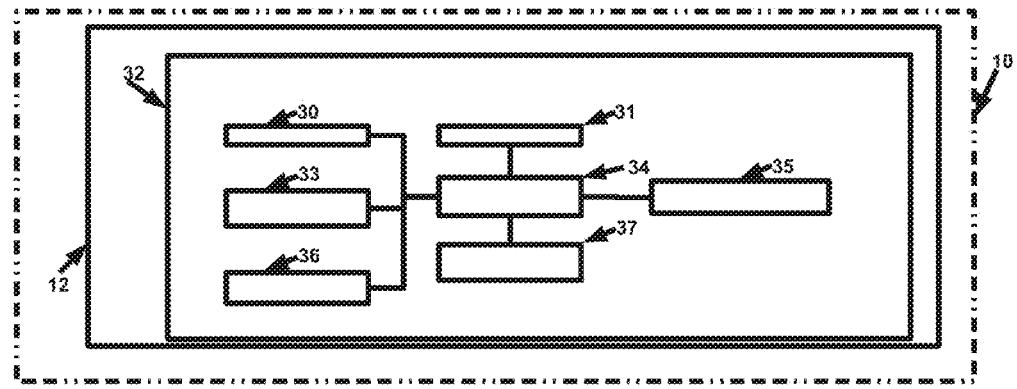
FIG. 1 is a general block diagram of the audio capture and transmission device of the present technology.

In the context of the present technology, the term "fitting generally over a user's mouth" means that at least the user's mouth is covered, but can include, for example, but not limited to a user's mouth and nose, and a user's face.

In the context of the present technology, the term "face-fitting" means fitting over the user's mouth, but may include a user's mouth and nose.

In the context of the present technology, the term "dual double catenary" refers to a structure that has two inner catenaries and two outer catenaries, an inner catenary and an outer catenary forming a catenary pair, the two catenary pairs opposing one another to form a face piece to define an opening.

In the context of the present technology, a radio receiving and/or transmitting short-wavelength UHF radio waves in the ISM band from 2.4 to 2.485 GHz is referred to as a Bluetooth® radio.

In the context of the present technology, a phone call or call is any sort of verbal communication over a wired or a processor controlled Bluetooth enabled communication device, such as, but not limited to a cellular phone, a laptop, a tablet, voice activated apps, recorders, transmitters, landline phones, computers or any device that uses speech and/or a microphone, including a telephone call, a Skype call and the like.

In the context of the present technology, a phone is any sort of, processor controlled wired or Bluetooth enabled communication device, such as, but not limited to a cellular phone, a laptop, or a tablet computer, voice activated apps, recorders, transmitters, landline phones, computers or any device that uses speech and/or a microphone.

Numerous features of the device were arrived at through testing and experimentation. These features, challenges and attributes that they impart on the technology are listed below, as follows:

1. Two radios housed in the interior cavity of the device. Two Bluetooth radios are used to provide simultaneous wireless communication to an ear piece and a wireless communication device. The advantage of being able to do this is that it optimizes sound reconstruction for the user. Poor sound reconstruction or a lack of sound reconstruction is very distracting for a user.

It was generally accepted by the industry that one cannot put two Bluetooth radios in close proximity because the signals will interfere with one another, causing noise, crosstalk and canceling each other out, or one may amplify the power going to the other antenna overloading the frontend. In fact, the manufacturer suggested that one cannot place two Bluetooth radios in close proximity, such as would occur in the device of the present technology.

In order to overcome interference between the two simultaneous signals and to achieve the greatest efficiency, various orientations and distances were tested. It was found that the antennae of the radios should preferably have a linear horizontal center-to-center distance of not less than about 25 mm and not more than about 27.5 mm with a preferred distance of about 27 mm with a vertical offset of not less than about 3 mm and not more than about 4 mm. The radio antennae are best mirrored on a fiberglass-resin stack-up. The stack-up is preferably not less than about 1.57 mm thick and not more than about 3.7 mm thick, to provide the appropriate shielding and impedance. Using this configuration, simultaneous wireless transmission between the device and each of an ear piece in the user's ear and the wireless communication device (which is preferably a cellular phone) was achieved.

2. Tapered air tube. The slim design that allows a user to easily slip the device into a pocket and to hold it comfortably in the hand results in a device with a small interior cavity. This limits the space for an air tube. The air tube is important for both air flow and for attenuation of sound emanating in the device. It was found that a wide tube allowed for sufficient air flow, but resulted in release of sound. A narrow tube reduced the air flow, but attenuated the sound better. An average adult speaking into the device is delivering about 1900 ml/second at peak air flow.

It was found that the most efficient air flow and attenuation of sound could be obtained by tapering the air tube. A straight tube was found to have a set pressure release, therefore optimization of pressure release would necessitate customization of the exhaust tube to the user. It was also found that a tapered exhaust tube provided a variable pressure release which makes the device more suitable for use by a much broader range of people.

3. Pressure buffer. While the tapered air tube provides good pressure control and sound attenuation, it was found that inclusion of a pressure buffer provided more even pressure control within the device and reduced both the intensity and number of pressure spikes. This makes the device more comfortable to use and helps to maintain voice transmission. Research has demonstrated that air pressure directly impacts sound attenuation. The greater the back or over pressure the greater the sound attenuation. However, user's have a limited tolerance for speaking in an over pressured environment. In fact, if the pressure is too high, the user may be unable to speak within that environment.

4. Voice Signal Enhancement circuit (VSE circuit). In a small device that is pressurized, the noise to signal ratio is high. The usual approach to dealing with this is to use two microphones configured for noise cancellation. The VSE circuit was designed to overcome this requirement specifically in the voice sound range. The circuit creates a phase shift on the signal which is then added back into the original signal both widening the frequency and amplifying the frequency as the feedback loop nears its designed center frequency. This was found to increase the target frequencies and widen the other frequencies, making them more apparent and stronger. The VSE circuit therefore results in stronger and clearer signals and obviates the need for a second microphone.

5. Dual double catenary face piece. This shape is best viewed in FIGS. 12 and 20. The face piece is the surface between each of the two dual catenary curves. Although pliable materials can be used to fit a wide range of face sizes and shapes, they must be pressed relatively hard against the user's face in order to form fit and significantly, in order to provide sufficient sound damping. Through testing on many user's, a dual double catenary shape was developed that fits a wide range of face sizes and shapes. As it fits a wide range of faces, it can be made of the same hard material as the remainder of the housing. This therefore provides better sound damping, both in terms of damping ambient sound and damping voice sound emanating from within the device. It is comfortable to use, as a user need not press to deform the face piece against the face in order for it to fit.

6. Design of the housing. The housing allows for the user to speak downward into the device without the device having a right angled housing. This shape provides for a small, thin, ergonomic device that can be easily carried and stored by the user.

Referring to FIG. 1, there is shown in general block diagram form, one embodiment of the technology. A body 10 houses a circuit board housing 12 with a circuit board 32 therein. The circuit board 32 is removable. The circuit board 32 has a processor 34 which is, without limitation, a microprocessor, and the following modules logically, electronically connected together: self-diagnostic and control module 30; audio capture module 33; power management module 36; listening output module 31; wireless radio 35; and data storage module 37.

Figure 2:
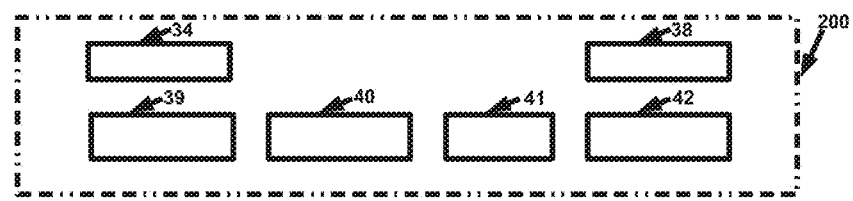
FIG. 2 is a general block diagram of the physical attributes of the device of FIG. 1.

As shown in FIG. 2, the physical attributes of the device 200 include an ergonomic design 38, pressure management 39, sound and noise silencing 40, voice audio isolation 41 and air flow management 42. In order to take advantage of advanced filtering, pressure management, and additional noise isolation, the processor 34 may handle floating point DSP (digital signal processing) algorithms.

Audio Capture

Figure 3:
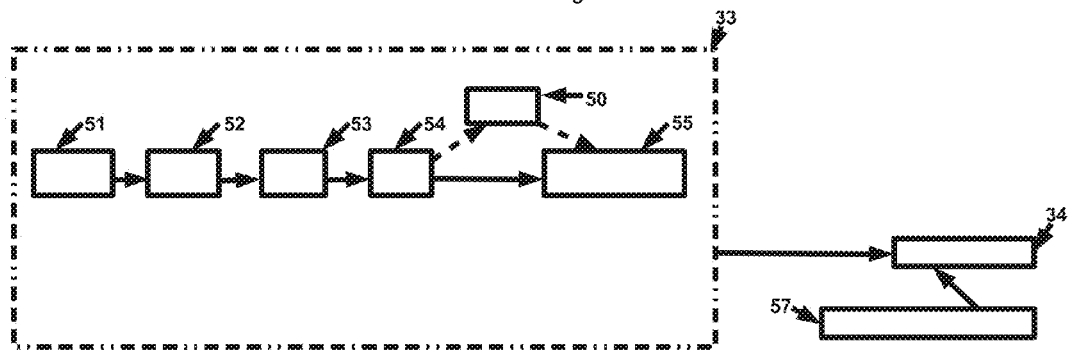
FIG. 3 is a block diagram of the audio capture module of the device of FIG. 1.

As shown in FIG. 3, the audio capture module 33 is logically controlled by the processor 34. The audio capture module has one microphone 51 connected to Voice Signal Enhancement (VSE™) Circuitry 52. The VSE circuitry allows the microphone to operate in a highly pressurized environment within the housing. The output from the VSE circuit 52 is received by an Analog-to-Digital (A/D) signal acquisition circuit 53 to acquire the voice signal which is subsequently processed by a stream processor 54.

The audio capture module 33 of the technology may or may not include a data encryption circuit 50 for enhanced security requirements. The data from the stream processor 54 and, optionally, the data encryption circuit 50 are received by a broadcast and recording processor 55. The VSE circuitry 52, A/D signal acquisition circuit 53, the stream processor 54, data encryption circuit 50 and broadcast and recording processor 55 are, without limitation, a part of the processor 34 rather than separate components. The processor 34 will, as directed by the user, determine if the data are to be recorded using a data storage module 57, a recording or broadcast device, or other connection as would be known to one skilled in the art. The data are broadcast and processed using two wireless radios 35, for example, but not limited to Bluetooth® modules/radios 35, as shown in FIG. 4A.

Wireless Communications

Figure 4A:
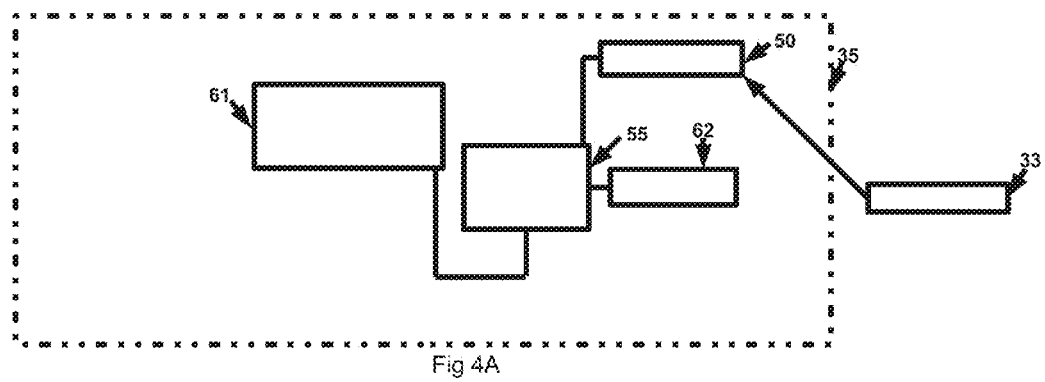
FIG. 4A is a block diagram of the wireless radio of the device of FIG. 1.

As shown in FIG. 4A the wireless radio 35 includes the broadcast and recording processor 55. The broadcast and recording processor 55 receives audio stream data from the audio capture module 33 which is a direct feed through the data encryption circuit 50. The broadcast and recording processor 55 controls the incoming and outgoing communications data streams by routing the data into or out of the communications interface 61 according to the settings retrieved from the configuration memory 62. The communications interface 61 receives data from the broadcast and recording processor 55. These data are converted to wireless audio for transmission. The configuration memory 62 stores the settings for all the wired and wireless communications in non-volatile storage and retrieval by the broadcast and recording processor 55 as needed.

Figure 4B:
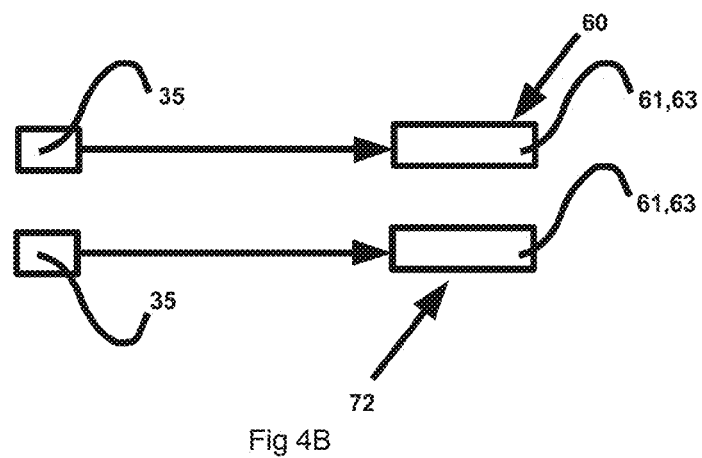
FIG. 4B is a block diagram of the wireless communication from the wireless radios of FIG. 4A.

As shown in FIG. 4B the first wireless radio 35 communicates to a first wireless communication device, generally referred to as 60, which in the preferred embodiment is a wireless earpiece 61 or a wireless headphone 63. The other wireless radio 35 simultaneously communicates with any type of a second wireless communication device, generally referred to as 72, for example, but not limited to a smart phone, a cell phone, a voice control system, a voice command system, a voice activation system, a voice authentication system, a voice recognition system, a dictation system, a second wireless earpiece 61 or a second wireless headphone 63 and a computer system.

Figure 4C:
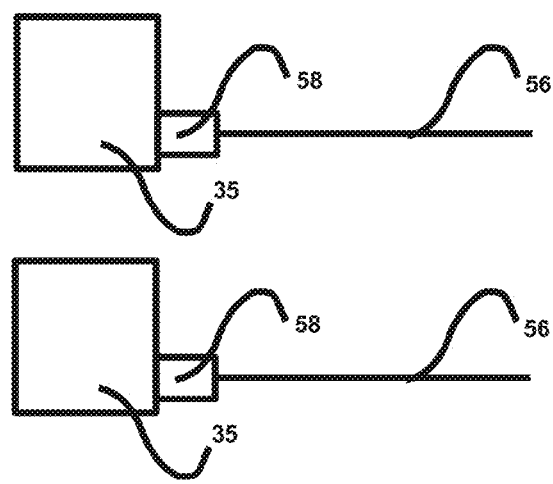
FIG. 4C is a block diagram of the wired communication from the wireless radios of FIG. 4A.

In another embodiment, shown in FIG. 4C, the radios 35 have wired connections 56 that are used through a USB (Universal Serial Bus). In addition to communications, the USB connection 56 is the preferable method for charging the device. Both diagnostics and device updates are delivered through USB.

In order to overcome interference between the two simultaneous signals and to achieve the greatest efficiency, specific selected proximity and orientations of the two transmitting antennae are used. The antennae are ceramic and have a frequency wavelength response of 31.25 mm when operating in the sub-¼ wavelength range.

Figure 4D:
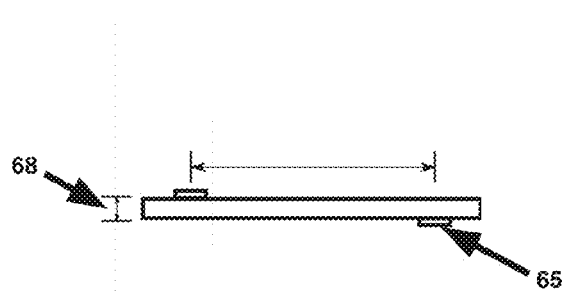
FIG. 4D is a schematic showing the orientation of the wireless radio antennae and stack-up of the device of FIG. 1.

As shown in FIG. 4D, the antennae 65 have a linear horizontal center-to-center distance of not less than about 25 mm and not more than about 27.5 mm with a preferred distance of about 27 mm with a vertical offset of not less than about 3 mm and not more than about 4 mm. They are mirrored on a fiberglass-resin stack-up 68. The stack-up is preferably not less than about 1.57 mm thick and not more than about 3.7 mm thick.

Listening Output

Figure 5:
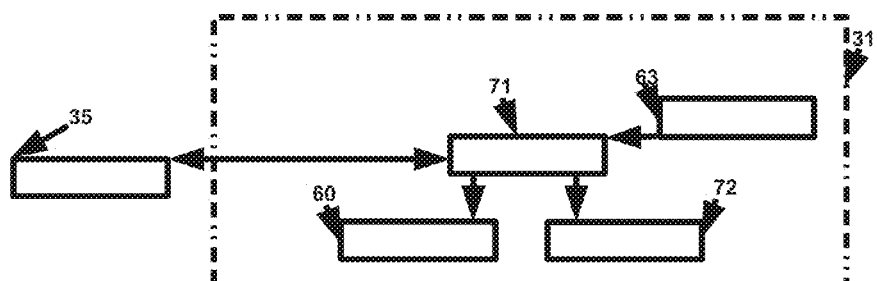
FIG. 5 is a block diagram of the listening output module of the device of FIG. 1.

As shown in FIG. 5, the listening output module 31 has a listening output processor 71 having input and output communications with the wireless radio 35. The wireless radio 35 can be, for example, but not limited to, a Bluetooth module. The listening device can be, for example, but not limited to, a wireless earpiece 60, or a wireless headphone 72. In an alternative embodiment, the listening device can be a direct wired ear or headphone 63.

Power Management

Figure 6:
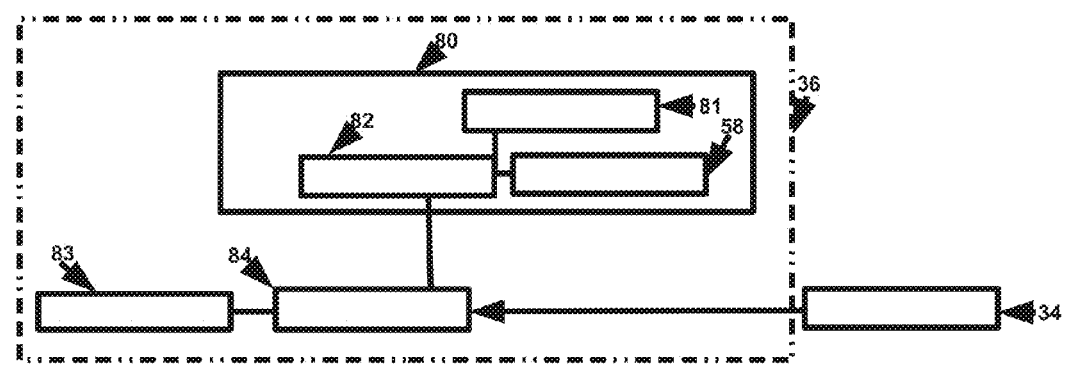
FIG. 6 is a block diagram of the power management module of the device of FIG. 1.

As shown in FIG. 6, the power management module 36 has a power source 80 which is, for example, but not limited to, one or more of a rechargeable DC battery 81, a charge management module 82 or the USB connection 58, which is connected and controllable by a power management processor 84. The power management processor 84 configures power usage, configures or adjusts the charge management module 82, and reports power and charge status back to the processor 34 which may or may not relay the information back to the user via an indicator 83. If the power source 80 is a battery 81, it can be recharged through the USB connection 58. Alternatively, other contact or wireless charging methods, controlled by the charge management module 82 can be used to charge the battery.

Data Storage

Figure 7:
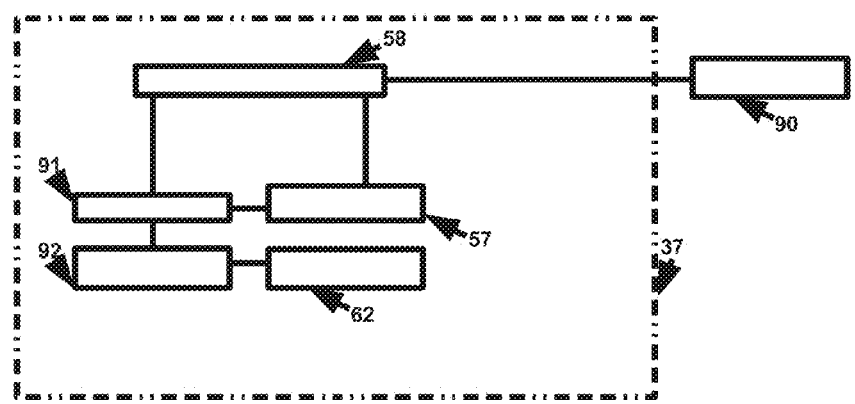
FIG. 7 is a block diagram of the data storage module of the device of FIG. 1.

As shown in FIG. 7, the data storage module 37 has a data storage processor 91 that controls the data in and out of the different storage devices including remote or plug-in storage 57, USB connection 58, and integrated data storage 92. Non-limiting examples of storage devices include flash drives, thumb drives, micro-flash, trans-flash and USB drive storage devices. Through the USB connection 58, a data stream can be, for example, but not limited to, transferred both by itself or recorded and transferred to a USB device such as, for example, but not limited to, a computer 90 or other suitable device. The data storage module 37 can also store configuration settings 62.

Diagnostics and Control

Figure 8:
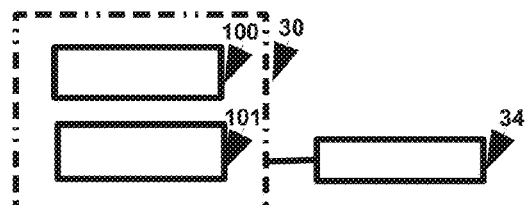
FIG. 8 is a block diagram of the self-diagnostic and control module of the device of FIG. 1.

As shown in FIG. 8, the self-diagnostic and control module 30 contains both software and hardware to test and assess the state of the device. The self-diagnostic and control hardware 100 interfaces with the processor 34 to send and accept data related to system analysis and reporting. The processor 34 is, for example, but not limited to, controlled through an interface and controller 101, which is, for example, but not limited to a touch screen interface, a capacitive touch interface, a gesture interface, or a remote application that returns the result information and sends commands to the self-diagnostic and control hardware 100.

The Device

Figure 9:
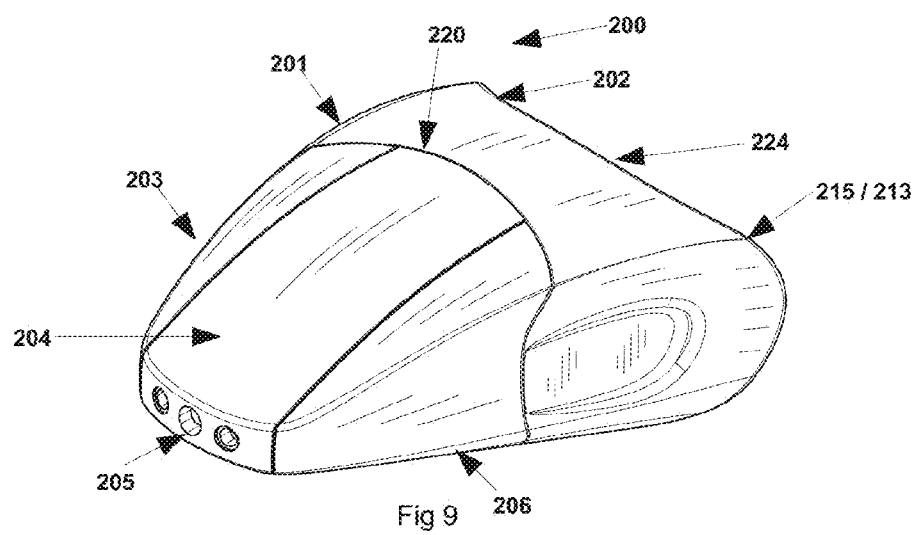
FIG. 9 is a perspective view of the device of FIG. 1.

FIG. 9 shows the audio capture and transmission device, generally referred to as 200. A housing, generally referred to as 203 has an angled, curved back 201 and a generally planar base 206 to create a wedge shape terminating in a distal end 205, a face piece 202 proximally and an access hatch 204 to a compartment in the rear of the housing 203. The access hatch 204 is for access to the battery or assembly. The housing 203 has an ergonomic shape to fit either hand. The housing 203 is adapted for the attachment of an elastic type strap to fit around the neck or head of the user to allow for hands-free use for those persons with certain physical disabilities or for those simply wishing to have both hands free.

The face piece 202 is located around the proximal end 220 of the housing 203 and is proximal to it. The face piece 202 defines a proximal opening 224 and is face-engaging. The user presses their face into the face-fitting rim 215 of the face piece 202, such that the face piece 202 abuts the chin, upper lip and cheeks of the user to form a seal against the face. The face piece is hard and made from the same material as the housing for example, but not limited to a molded or printed plastic polymer, preferably 4 mm to 5 mm hard acrylonitrile butadiene styrene (ABS) plastic polymer. This has a Shore D durometer rating of about 70 to about 85. The face piece 202 and housing 203 may alternatively be a single unit. Whether one unit or two, they can generally be referred to as a face-fitting rim 215. In an alternative embodiment, the face piece 202 is pliable, and made from, for example, but not limited to, hypo-allergenic rubber or hypo-allergenic plastic polymer. As noted above, the shape of the opening 224 allows the face piece to accept a wide range of face sizes and shapes. In an alternative embodiment, the face piece 202 covers both the mouth and nose to prevent further leakage of voice sounds but still should provide a tight seal against the face.

Figure 10:
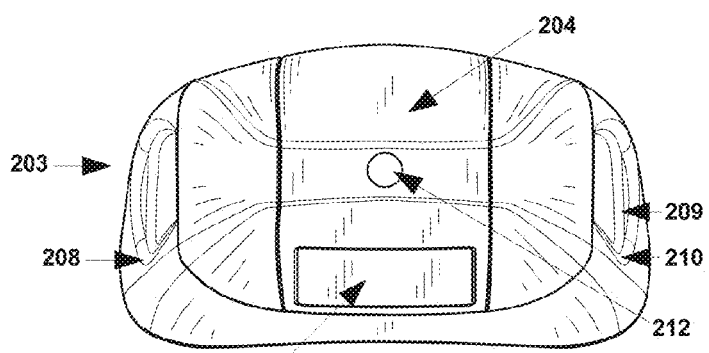
FIG. 10 is a view from the distal end of the device of FIG. 9.

As shown in FIG. 10, the housing 203 includes a full color Liquid Crystal Display (LCD) touch screen interface 214 to allow the user to monitor various device functions and statuses. At least one exhaust or relief port 212 is located at or in the vicinity of the distal end 205, and a first side 208 and a second side 210 have indents 209. The housing 203 is preferably a molded or printed plastic polymer, preferably 4 mm to 5 mm hard acrylonitrile butadiene styrene (ABS) plastic polymer. This has a Shore D durometer rating of at least about 70 to at least about 85. The material used in the housing promotes sound attenuation.

Figure 11:
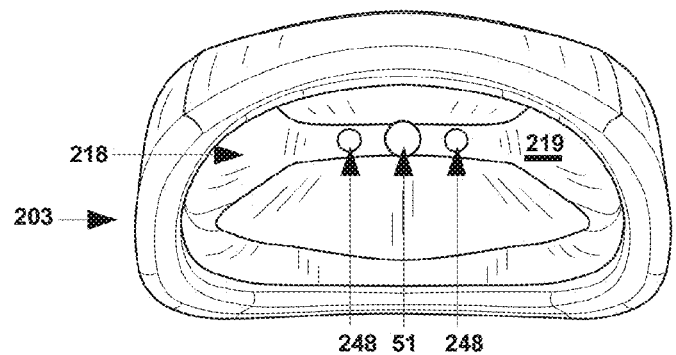
FIG. 11 is a view from the proximal end of the device of FIG. 9.

As shown in FIG. 11, an interior cavity 218 is defined by the housing 203. The inner surface 219 of the housing 203 is shaped to encourage reflection of sound waves within the housing 203 and is preferably concave, and more preferably rounded. A pair of air tubes 248 are located in the interior cavity 218 with the microphone 51 located in the interior cavity 218 between the air tubes 248.

Figure 12:
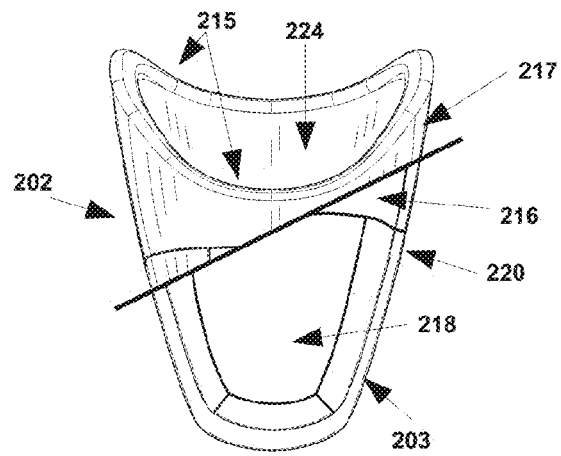
FIG. 12 is a side view of the device of FIG. 9, with a cutaway shown as a line extending across the drawing at an angle off the horizontal.

As shown in FIG. 12, the face-fitting rim 215 of the face piece 202 has a concave dual double catenary shape. This shape has been found to provide the best tight seal against the face to prevent or reduce or minimize sound escaping as well as being very comfortable for the user. The face piece 215 has a bore 216 in the body 217 that extends from the opening 224 to the interior cavity 218 of the housing 203.

Figure 13:
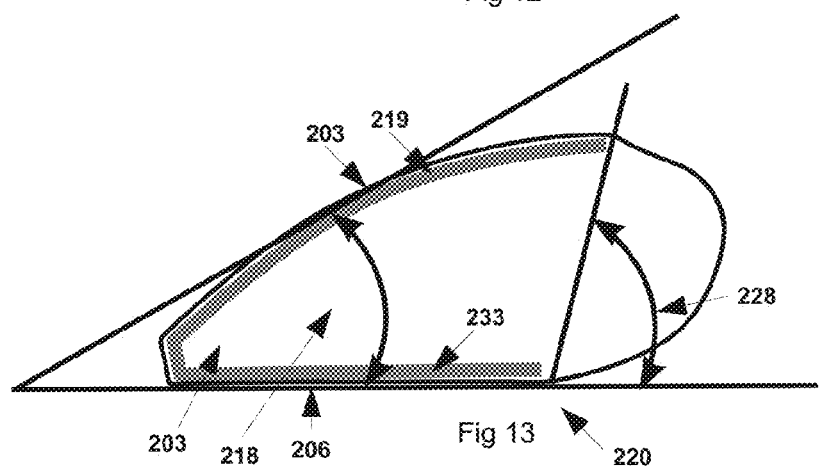
FIG. 13 is an interior sectional view showing the lining of the device of FIG. 9.

As shown in FIG. 13, the proximal end 220 of the housing 203 defines an angle 228 with the base 206 of about 40 to about 70 degrees, more preferably about 45 to about 60 degrees and most preferably about 55 degrees. The angle 228 allows the device to be thin enough to fit in the pocket of a user, while providing superior sound pickup, and it creates, along with the taper of the device, a user friendly, natural position for the user to hold it in their hand, when in use.

Also shown in FIG. 13, a sound damping material 233 may line much or all of the inner surface 219 of the housing 203. This material 233 is about 1 mm to about 8 mm thick, preferably about 2 mm to about 6 mm thick and most preferably about 3 to about 5 mm thick. Preferably, the sound damping material is also a moisture absorbing material such as acoustic or open cell foam. It is removably attached to the inner surface 219 by closures such as Velcro®. The sound damping material 233 may cover the microphone 51 shown in FIG. 14 and may substantially, but not completely, fill the interior cavity 218. The attenuation can be changed by a textured surface, such as, but not limited to, dimpling, waves, and curves.

As shown in FIG. 14, the microphone 51, which is, for example, but not limited to, an electret microphone or a Micro-Electrical-Mechanical System microphone, is housed in the circuit board housing 12 on the inner surface 219 of the housing 203 in the vicinity of the proximal end 220, preferably about 15 mm to about 35 mm from the proximal end 220, more preferably about 20 mm to about 30 mm, and most preferably about 25 mm. These distances have been found to provide for superior sound pickup. The air tubes 248 are located adjacent the circuit board housing 12.

As shown in FIG. 15 at least one exhaust or relief port 212 is located at the distal end 205 of the device 10. The exhaust system, generally referred to as 240, is comprised of at least one exhaust port 212 and at least one air tube 248 which may be connected directly to the exhaust port 212, but preferably is attached to a pressure buffer 241. If present, the pressure buffer 241 is connected to the exhaust port 212 at one end and to the air tube or tubes 248 at the other end. All are housed within the housing 203 and result in gaseous communication between the interior cavity 218 and an ambient environment. The air tube 248 extends from the pressure buffer 241 terminating proximally in the vicinity of the proximal end 220. The air tube 248 is preferably tapered or funnel shaped. If so, for one air tube 248, the air tube interior diameter is approximately 15 mm at the air tube proximal end 249, more preferably 10 mm interior diameter at the air tube proximal end 249 and most preferably 12 mm in interior diameter at the air tube proximal end 249. The air tube distal end 245 is approximately 8 mm in interior diameter, more preferably 5 mm interior diameter and most preferably 6 mm in interior diameter. The diameter is adjusted to provide the same air flow from the housing for two or more tubes as is provided by one tube. In all cases, the taper is approximately 9.4 degrees, more preferably 5.9 degrees and most preferably 7.04 degrees. Without being bound to theory, the placement and taper of the air tube 248 reduces any restriction of the user's breathing by reducing air pressure and optimizing air flow while reducing loss of sound. In alternative embodiments, the air tube 248 could be one or more of oblong in cross section, have a bulb in it, and be located proximate the side 210 or back 201.

Still referring to FIG. 15, in one embodiment, the pressure buffer 241 has baffles 243. In another embodiment, shown in FIG. 16, the pressure buffer 241 is a convoluted passageway 253. In yet another embodiment, the baffles are adjustable. There are one or more pressure buffers 241.

Figure 17:
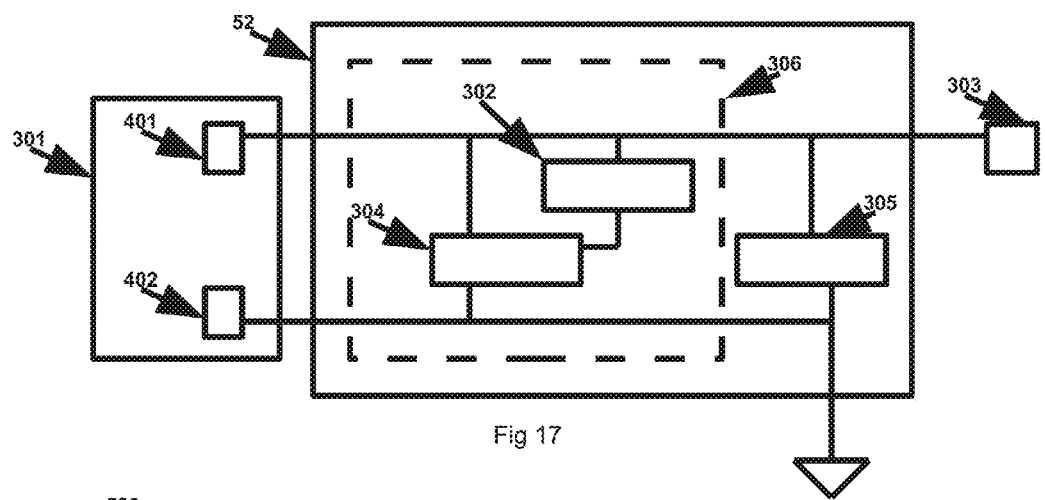
FIG. 17 is a block diagram of the Voice Signal Enhancement circuitry of the device of the present technology.

The details of the VSE circuitry with an electret microphone are shown in FIG. 17. An input from the microphone 301 includes the positive terminal 401 and the negative terminal 402. The VSE circuit 52, which is on a circuit board, has a capacitor 305 and a resistor 306 (with a fixed capacitance), that may or may not be variable and that includes resistance part A 302 and resistance part B 304. An audio output 303 is connected to the VSE circuit. The resistor 306 is connected between the positive 401 and negative poles 402 of the electret microphone capsule (which corresponds to the drain and the source of the JFET). If the resistor 306 is variable, it allows for tuning and controlling the drain current characteristics of the JFET.

A sound wave, composed of frequencies within the range of human hearing, of oscillating pressure (SPL—Sound Pressure Level), impacts the capacitive transducer/transduction film within an electret (or other) microphone capsule 51 causing a capacitive difference that drives the gate of the JFET (Junction Field Effect Transistor) inside (or external if one is not contained within) the microphone capsule. The VSE circuit with a variable resistor allows for: reducing the output noise voltage; increasing the gate cutoff voltage sensitivity; increasing the saturation sensitivity; and controlling the voltage gain output for specific SPL requirements. The variable aspect of the resistor may be needed to adjust to the non-defined acquisition circuit/devices admittance, reactance and impedance characteristics but requires a fixed and stable bias voltage within a narrow range.

The circuit creates a phase shift on the signal which is then added back into the original signal both widening the frequency and amplifying the frequency as the feedback loop nears its designed center frequency. The VSE circuit should be as close to the input as possible, taking the input and output component and junction parameters into consideration. In the case of Micro-Electrical-Mechanical System (MEMS) sensors, additional elements need to be added to the circuit, as described below.

The use of VSE for audio has little perceptible effect at lower end frequencies of the voice spectrum and a significant effect at the higher end of the voice spectrum. This widening and amplification is very beneficial for algorithms that key on the higher frequencies for information such as the Hidden Markov Model algorithm commonly used in speech recognition.

Figure 18:
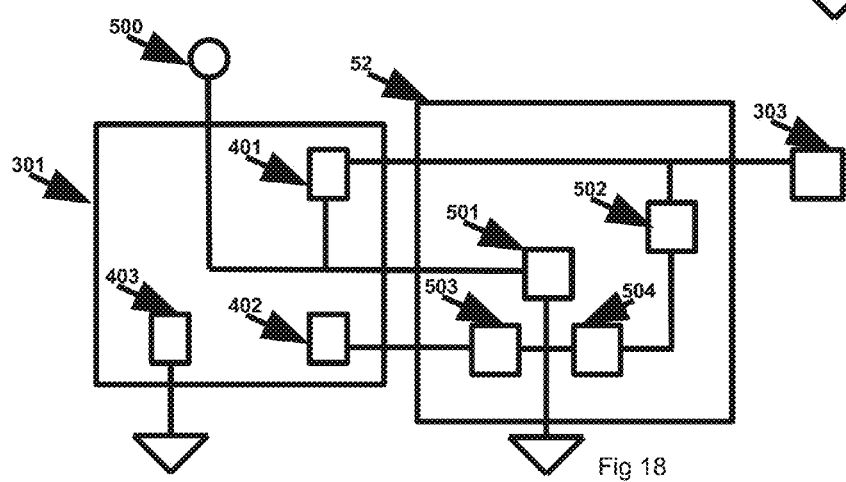
FIG. 18 is a block diagram of the Voice Signal Enhancement circuitry of the device of the present technology with a Micro-Electrical-Mechanical System microphone.

FIG. 18 shows the VSE circuit for a Micro-Electrical-Mechanical System microphone. The circuit, which is a circuit board, generally referred to as 52 includes capacitors 501, 502, 503, and resistor 504. The input MEMS sensor 301 includes the positive output 401, the negative output 402 and the signal or digital ground 403. An audio output 303 is connected to the VSE circuit. A power bias supply 500 provides power to the circuit board 52 and MEMS sensor 301.

Figure 19:
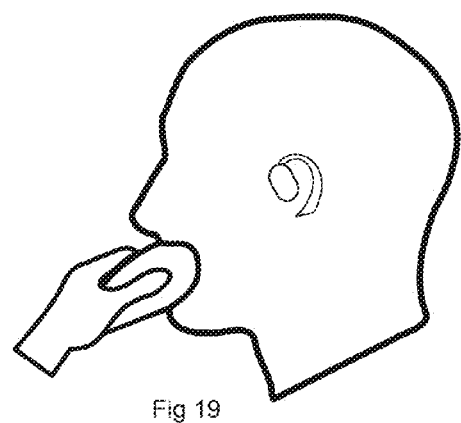
FIG. 19 shows a method of using the device of the present technology.

There are various ways in which the device 10 can be used. The device may be held in the hand to capture and attenuate an audio signal from an audio source. The audio signal travels to the device from the audio source. A user can hold the device away from their mouth to capture and attenuate the audio signal from the user's mouth. The voice sound waves travel from the user's mouth to the device. The preferred embodiment is shown in FIG. 19. The user holds the device to their face and uses the wireless earpiece. The voice sound waves are emanated within the device. An ambient noise (noise from outside of the device and other than the user's voice) is reduced or minimized by the device. One radio provides the earpiece with a signal so that the user hears the voice emanated within the device, and simultaneously, a cellular phone is provided with a signal from the other radio so that a recipient hears the voice emanated within the device.

The details of the dual double catenary, generally referred to as 600, are shown in FIGS. 20A, 20B, 20C, 20D, 20E and 20F. As shown in FIG. 20A, a first curve 602 and a second curve 604 create a tensioned area 606 therebetween. A cross section, as shown in FIG. 20B, shows the tensioned area 606 between the two curves 602, 604. As shown in FIG. 20C, a tensioned flap curve 608 is located between and created by a third curve 610 and a fourth curve 612. A cross section, as shown in FIG. 20D, shows the tensioned flap curve 608 between the two curves 610, 612. FIG. 20E is a schematic demonstrating how the tensioned area 606 and tensioned flap curve 608 are created. FIG. 20F is the equation for a catenary.

Figure 21:
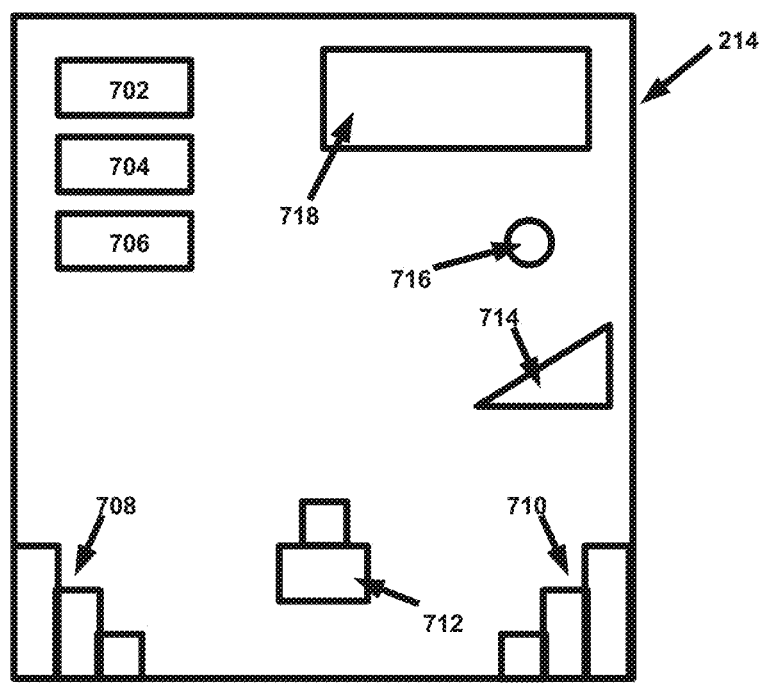
FIG. 21 is a schematic of the touch screen interface.

Details of the touch screen interface 214 are shown in FIG. 21. Incoming calls are displayed on an incoming call display 702 and can be answered and ended using screen controls 704, 706 while leaving the associated communication device, which may be a phone, in a pocket or purse, thus significantly reducing the SAR (Specific Absorbed Radiation) to the user to about 0.01% of the typical mobile phone. The screen also shows information on the battery charge level on a battery charge level indicator 708, Bluetooth pairing connections, Bluetooth signal strength on a signal strength indicator 710, whether wired or Bluetooth headphones are attached on an attachment indicator 712, microphone volume level on a volume indicator 714 and a mute button 716 for the microphone. Calls may also be placed using the screen's outgoing call function on a keypad 718 which mimics that of the phone. The configuration memory 62 stores instructions for the processor 34 to effect these activities.

Advantages of the exemplary embodiments described herein are realized and attained by means of the instrumentalities and combinations particularly pointed out in this written description. It is to be understood that the foregoing general description and the following detailed description are exemplary and explanatory only and are not restrictive of the claims below. While example embodiments have been described in detail, the foregoing description is in all aspects illustrative and not restrictive. It is understood that numerous other modifications and variations can be devised without departing from the scope of the example embodiment. For example, in an alternative embodiment the face piece is molded to the housing or it is separate and removable. Similarly, in an alternative embodiment, a barrier layer is located between the sound damping material and the housing.

The invention claimed is:

1. An audio capture and transmission device for simultaneously communicating with a first wireless communication device and a second wireless communication device, the audio capture and transmission device for fitting generally over a user's mouth, the audio capture and transmission device comprising: a single microphone; two wireless BLUETOOTH radios, wherein each of the BLUETOOTH radios includes an antenna to provide two antennae, the two antennae positioned to have a linear horizontal center-to-center distance of not less than about 25 mm and not more than about 27.5 mm between the antennae; circuitry; a housing, the housing including a proximal end, a distal end, a back, a first side, a second side and a base, the back, the first side, the second side and the base extending from the proximal end to the distal end, to define an interior cavity, the interior cavity housing the microphone and the wireless radios, the microphone in electronic communication with the circuitry and the wireless radios; a face piece located at the proximal end of the housing, the face piece defining a proximal opening continuous with the interior cavity and having a face-fitting rim; and an exhaust system, the exhaust system in gaseous communication with the interior cavity and an ambient environment, and including an at least one air tube, and an exhaust port, the at least one air tube extending from the interior cavity to the distal end, where it terminates in the exhaust port.

2. The device of claim 1, wherein the antennae are mirrored on a fiberglass-resin stack-up.

3. The device of claim 2, wherein the fiberglass resin stack-up is not less than about 1.57 mm and not more than about 3.7 mm.

4. The device of claim 3, wherein the circuitry includes a voice signal enhancement (VSE) circuit, the VSE circuitry including a potentiometer.

5. The device of claim 4, wherein the microphone is located about 15 to about 35 mm from the proximal end.

6. The device of claim 5, wherein the face-engaging proximal end has a dual double catenary.

7. The device of claim 6, wherein the exhaust system includes at least one pressure buffer, the at least one air tube extending from a vicinity of the face-engaging proximal end to the at least one pressure buffer and the at least one pressure buffer extending to the exhaust port at the distal end.

8. The device of claim 7, wherein the housing is tapered from the proximal end to the distal end and the proximal end of the housing defines an angle with the base of about 40 to about 70 degrees.

* * * * *